(12) United States Patent
Ghassabian

(10) Patent No.: US 6,535,605 B1
(45) Date of Patent: Mar. 18, 2003

(54) WRIST-WORN CELLULAR PHONE DEVICE HAVING MULTI-SECTIONED KEYPAD

(75) Inventor: Firooz Ghassabian, Tel Aviv (IL)

(73) Assignee: Classicom, LLC, Great Neck, NY (US)

(*) Notice: Subject to any disclaimer, the term of this patent is extended or adjusted under 35 U.S.C. 154(b) by 0 days.

(21) Appl. No.: 09/330,728

(22) Filed: Jun. 11, 1999

Related U.S. Application Data

(63) Continuation-in-part of application No. 08/867,062, filed on Jun. 2, 1997, now Pat. No. 6,035,035.

(30) Foreign Application Priority Data

Dec. 19, 1996 (IL) .................................................. 119873
Apr. 4, 1997 (IL) .................................................. 120605

(51) Int. Cl.[7] .............................................. H04M 1/00
(52) U.S. Cl. ................................ 379/433.1; 379/433.07
(58) Field of Search .................................. 379/433, 428, 379/368, 433.1, 433.07; 235/462.44, 462.45, 472.01; 368/88

(56) References Cited

U.S. PATENT DOCUMENTS 4,985,878 A * 1/1991 Yamada et al. ................ 368/88
5,898,161 A * 4/1999 Devita et al. ............ 235/462.44

* cited by examiner

*Primary Examiner*—Jack Chiang
(74) *Attorney, Agent, or Firm*—Sofer & Haroun, LLP

(57) ABSTRACT

A wrist-mounted telephone device for attaching to a wearer's wrist. The device comprises a bracelet configured to be attached to a wearer's wrist. The bracelet is configured to support a cellular phone mechanism accommodated in a housing and a battery power source coupled to the housing. The device also comprises a keypad attached to the bracelet and coupled to the cellular phone mechanism so as to provide signals thereto. The keypad has a plurality of adjustable sections, which close to a size which is smaller than the size of the keypad when in the open position. Advantageously, a first section of the keypad is attached to the bracelet and a second section of the keypad is pivotably attached to the first section so as to conceal the buttons on each of the first and second sections when the second section is pivoted relative to the first section into a closed position.

26 Claims, 9 Drawing Sheets

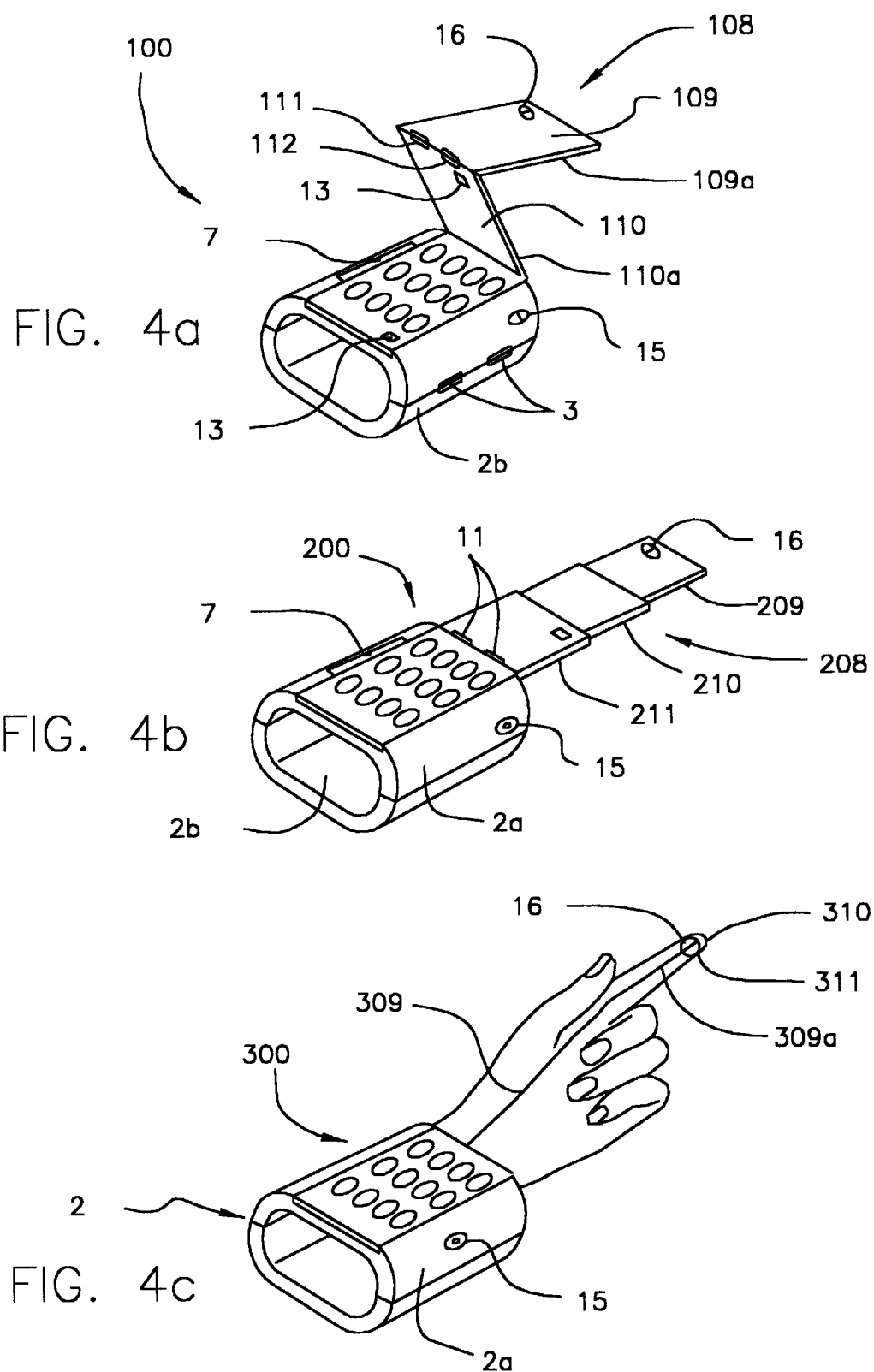

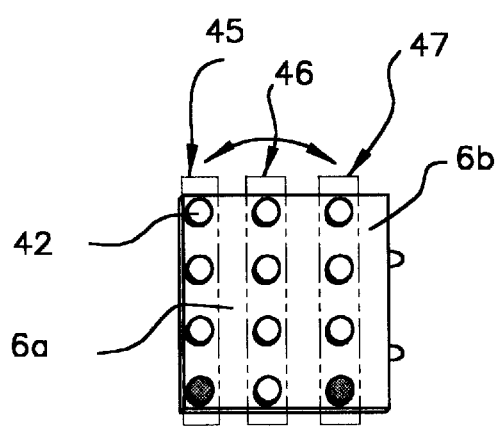
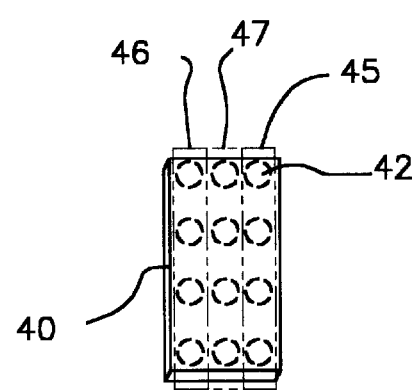
OPEN POSITION
CLOSED POSITION
VIEW OF INSIDE
FIG. 7a
FIG. 7b

WRIST-WORN CELLULAR PHONE DEVICE HAVING MULTI-SECTIONED KEYPAD

RELATED DATA

This application is a continuation-in-part of U.S. patent application Ser. No. 08/867,062 filed on Jun. 2, 1997, U.S. Pat. No. 6,035,035.

FIELD OF THE INVENTION

The present invention generally relates to portable cellular telephone devices, and more particularly to a wrist-worn cellular phone having a multi-sectioned keypad.

BACKGROUND OF THE INVENTION

A cellular telephone is a familiar personal communication accessory which is widely used. Early models were bulky, being carried in motor vehicles or in back packs. Further developed models were stored in a pocket or clipped onto a belt when not in use. They were, therefore, prone to falling, breaking, or simply being forgotten. Additionally, these models suffered from the time loss caused by taking such cellular telephones out of a garment pocket, or belt holder, adjusting the phone's orientation to actuate an answer mode.

A number of wrist telephone devices have been developed and disclosed, for example, in U.S. Pat. Nos. 5,239,521; 5,274,513; 5,224,076. In all these disclosures a telephone device is typically in the form of a wristwatch fastened to the user's wrist via a strap, wherein a cellular phone mechanism replaces that of a watch in its conventional location. The main components of a cellular phone mechanism, such as transceiver, telephone call initiating means, a keyboard, a voice recognition device, a display, etc., as well as a battery power source, are accommodated within a common case. A microphone and a speaker are usually incorporated within the strap.

For example, in a device disclosed in the U.S. Pat. No. 5,239,521, a strap has a member pivotally coupled thereto in a manner to be rotatable between its inoperative position, being aligned with and fastened to the strap, and an operative position, being perpendicular to the strap. The pivotal member functions as an ear piece, having a receiver at its free end and a microphone mounted on or close to its opposite end, proximate to the strap.

The telephone devices disclosed in the above patents suffer from a common disadvantage associated with the fact that a battery is substantially small in size and, therefore, low-power. Indeed, the battery is always a part of the case containing the phone mechanism, which case is supported on the user's wrist like a watch unit by means of a conventional strap.

WO Publication No. 95/35622 discloses a telephone device which may be used as a wrist-watch cellular phone by mounting it onto a conventional strap to be attached to the user's wrist. Here, a battery is accommodated in a separate case which is, at its one end, coupled by hinges to the end of a case containing the phone mechanism. However, the battery is still of a small size and associated with the same portion of the user's wrist as the case containing the cellular phone mechanism. The two interconnected cases are typically associated with the strap which connects their free ends and supports them on the user's wrist.

It is thus evident that in the conventional devices of the kind specified a battery is too small to meet the requirements of the user, while a strap always occupies at least half of the user's wrist, which is free of both the battery and phone mechanism.

Additionally, most of the known cellular phone devices suffers from a disturbance caused thereby when it starts to ring, for example, when the user is at public gathering concert, lecture, or the like. It is often the case that the user wishes his cellular phone to be permanently switched on so as to be immediately informed of an incoming call. However, it would clearly be desirable for the phone device to be actuated in a manner to inform the user of an incoming call without disturbing others within his/her close vicinity. In order to solve such a problem, a vibrator is usually included in the cellular phone mechanism and is connected to a phone ringer in a manner to cause a continuous vibration of the whole cellular phone device when actuated by an incoming call. It is understood that this act of vibrating the whole device results in significant waste of energy.

In addition to the problems described above, the cellular phones in the prior art that are configured to be worn on the wrist are difficult for a user to operate. For instance, the decrease in size of the cellular phone to that which can comfortably be worn on a person's wrist typically results in a corresponding decrease in the overall size of the keypad of the cellular phone. The small overall size of the keypad in turn requires that the keys of the keypad be smaller and/or closer in proximity. The small, closely-spaced keys are difficult for a user to operate, in that the wrong keys may be inadvertently pressed.

Thus, a need exists for a wrist-worn cellular device which provides a keypad which is larger and easier for a user to operate.

SUMMARY OF THE INVENTION

It is thus a major object of the invention to eliminate the above listed and other disadvantages of conventional cellular phone devices and provide a novel wrist-mounted telephone device.

It is a further object of the invention to provide such a device which is shaped like a bracelet, wherein all main components of a cellular phone mechanism and a battery power source are distributed around the user's wrist in the most effective manner. This enables the design of a battery of significantly larger dimensions which is easily replaceable without disturbing the cellular phone mechanism itself.

There is thus provided according to one aspect of the present invention a wrist-mounted telephone device for attaching to a wearer's wrist. According to one embodiment, the device comprises a bracelet configured to be attached to a wearer's wrist, wherein the bracelet is configured to support a cellular phone mechanism accommodated in a housing and a battery power source coupled to the housing. The device also comprises a keypad attached to the bracelet and coupled to the cellular phone mechanism so as to provide signals to the cellular phone mechanism. The keypad has a plurality of adjustable sections.

It is noted that the present invention is not limited in scope to any particular embodiment of a wrist device. For example, in accordance with other embodiment of the invention, the multi-sectioned keypad of the present invention may be employed with any wrist-worn device, regardless of the configuration of the device or the battery power source employed by the device.

Preferably, the keypad comprises buttons, which when pressed, send corresponding signals to the wrist device such as a wrist worn phone mechanism. The keypad comprises two, three or more sections, wherein typically a first section is attached to the bracelet or the strap disposed around the user's wrist, and the remaining sections are attached to the first section, for instance by being pivotably attached to the first section by a hinge or by being telescopically supported and extended thereby.

In accordance with another embodiment of the invention, the keypad comprises a plurality of pressure sensitive switches that employ pressure transducers so as to operate as key elements of a keypad. As a result, the keypad in accordance with this embodiment of the invention can be made substantially thin and flexible.

Advantageously, a second section is pivotably attached to the first section so as to conceal the buttons on each of the first and second sections when the second section is pivoted relative to the first section into a closed position. It is also preferred that the second section is pivotably attached to the first section so as to form a flat keypad when the second section is pivoted relative to the first section into an open position.

In one embodiment, the housing and the battery power source form together a first and a second interlocking parts, respectively, of a bracelet. The construction may be such that at least one of the first and second portions of the bracelet has C-shaped or flat geometry.

It is understood that the battery power source is adapted to be electrically connected to the cellular phone mechanism. The electrical connection may be in the form of wires.

Preferably, the battery power source substantially occupies the wearer's wrist. The housing containing the cellular phone mechanism may be located at a palm side of the wearer wrist.

The housing and the battery power source are coupled by a connector providing mechanical engagement thereof. The connector may comprise hinges, or a clasp mechanism, or at least one belt. The connector is substantially small so as not to occupy a significant portion of the wearer's wrist. In the case of the belt, it may be formed of plastic, fabric, or the like material.

The cellular phone mechanism comprises an ear piece extendable towards a region of a palm of the wearer and retractable to a region of the housing. Preferably, the ear piece is extendable along an axis of the wearer's arm. The ear piece may be extended by means of a flip open cover pivotally coupled to the housing and may be further extended by at least one telescopic, or accordion like segment of the cover. Alternatively, the ear piece of the cellular telephone mechanism may be mounted at an end of a tube having a securing arrangement for securing to a wearer's finger. Upon release of the securing arrangement, the tube is retracted into the housing by means of a resilient biasing means coupled to the end of the tube.

The battery power source may comprise a single battery circumferentially extending along at least a substantial portion of the wearer's wrist, or a plurality of batteries coupled to each other and each circumferentially extending along the wearer's wrist. It is understood that a battery of any kind may be employed. The battery may be removably accommodated within a case.

If the plurality of batteries is employed, each of them may be accommodated within its case and the cases are coupled to each other. To this end, the device, preferably, comprises an electric circuit adapted for selectively connecting the cellular phone mechanism to a preset one of the plurality of batteries.

Preferably, the cellular phone mechanism includes an antenna, which may be of a telescoping kind. The device may also comprise an indication means responsively coupled to the cellular phone mechanism for alerting, the wearer of an incoming call. The indication means preferably comprises a vibrator in the form of a mechanical assembly including a reciprocating prong for prodding the wearer's wrist. The device may also comprise at least one data display panel.

According to one embodiment, the device includes a vibrator which, when actuated, indicates a wearer of an incoming call without causing the vibration of the whole device.

Preferably, the device also comprises a watch unit. The watch unit and housing are disposed in a diametrically opposite relationship on the wearer's wrist.

BRIEF DESCRIPTION OF THE DRAWINGS

In order to understand the invention and to see how the same may be carried out in practice, several preferred embodiments will now be described, by way of example only, with reference to the accompanying drawings, in which:

FIGS. 4a to 4c illustrate three more embodiments of the invention;

FIGS. 7(a) and 7(b) illustrate an arrangement of buttons on a keypad which prevents the buttons from contacting each other when the device is in the closed position, according to one embodiment of the present invention;

DETAILED DESCRIPTION OF THE PREFERRED EMBODIMENTS

Figure 1:
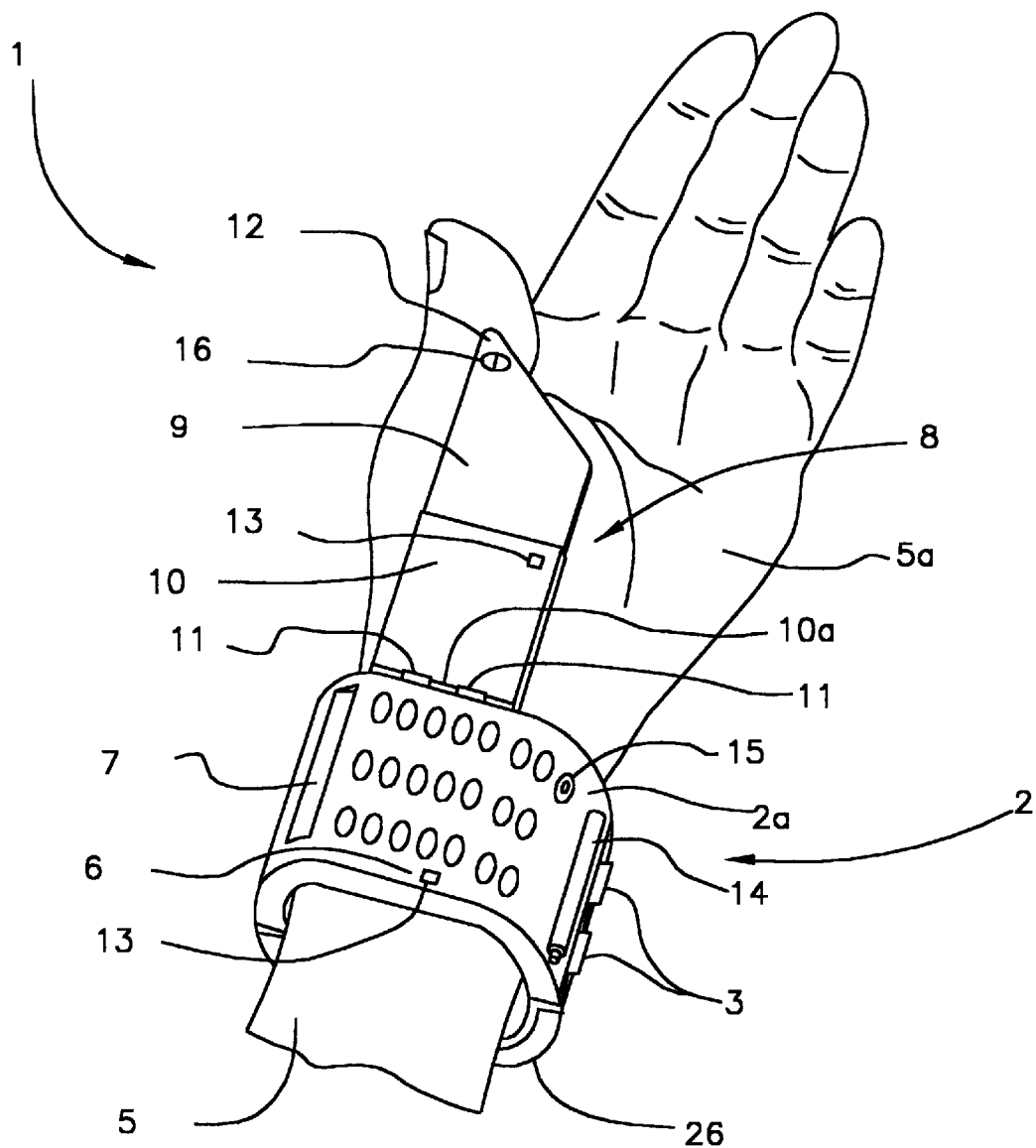
FIG. 1 is a pictorial illustration of a wrist-mounted cellular phone device according to one embodiment of the invention.
Figure 2:
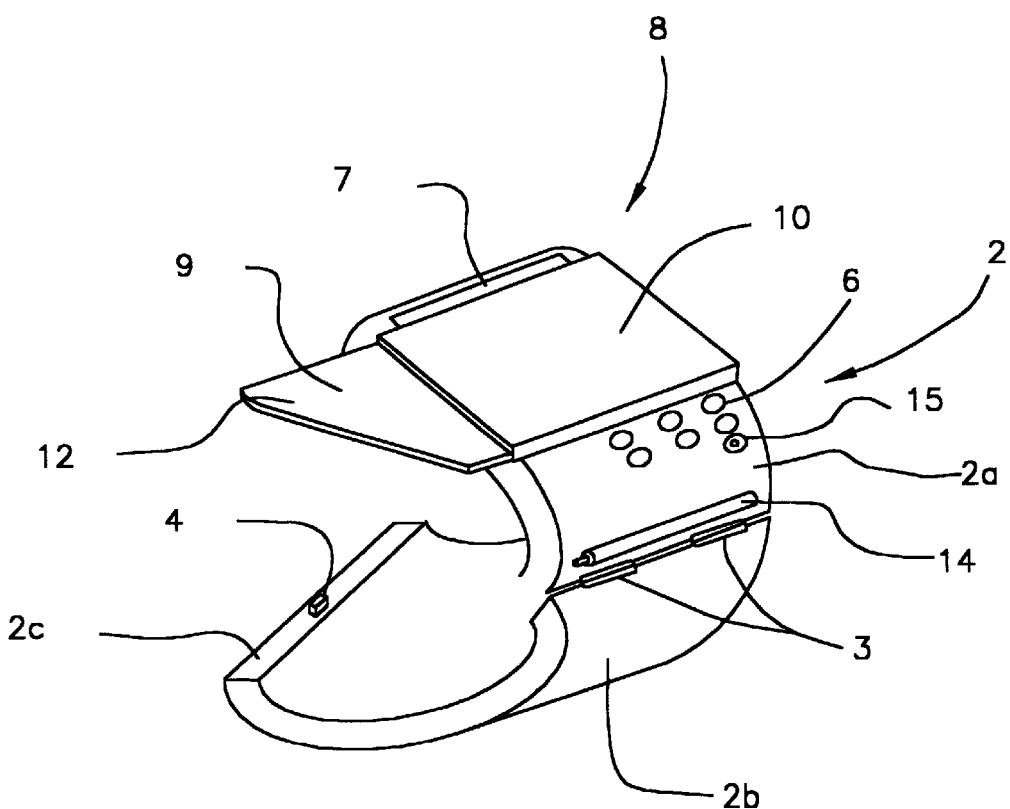
FIG. 2 is a pictorial view of the device of FIG. 1 more specifically illustrating an unlocked position thereof.

Referring to FIGS. 1 and 2 there is shown a device generally designated 1 which comprises a housing in the form of a bracelet 2 having two C-shaped portions 2a and 2b. The portions 2a and 2b are at one end permanently coupled by a pair of hinges 3 so as to be pivotal one relative to the other between a closed state of the bracelet 2 when being worn on a wrist 5 of the user, and an open state for removing the bracelet from the user's wrist. The portions 2a and 2b at an opposite end are interlocked by a clasp mechanism of known type, for example having a latch 4 made on an inside butt end 2c to engage a respective recess made in an interfacing butt end (not shown) of the portion 2a. It is understood that appropriate means are provided for easily unlocking the latch 4 by the user's hand.

It is also appreciated that any other coupling mechanism may be employed for the same purpose of providing such a mechanical engagement between the portions 2a and 2b that, on the one hand, is insured against accidental unlocking, and, on the other hand, is adapted to be easily unlocked by the user. For example, a magnetic clasp mechanism may be used.

As shown in FIG. 1, the bracelet 2 wraps around the user's wrist 5 in such a manner that all main components of a conventional cellular phone mechanism, except for the battery, are disposed at one-side 5a of the wrist 5, for example, a palm side. Thus, the portion 2a is provided on the outside thereof with a conventional keypad 6 easily available for the user. It is noted, however, that keypad 6 need not be disposed on the outside of C-shaped portion 2a as shown in FIG. 1, but may instead be disposed on device 1 according to various different configurations, such as those shown in FIGS. 6 through 8 (described in detail below).

Portion 2a is also provided on the outside with a liquid crystal display 7. The display 7 is typically capable of displaying a number currently dialed by the user when transmitting an outgoing call from the device 1, and also a number of a remote telephone device generating an incoming call, if such option is authorized by an owner of the remote telephone.

Coupled to the portion 2a of the bracelet 2 is a flip open telescopic cover, generally at 8, formed of two hinged plates 9 and 10. The plate 10 is recessed and slightly larger than the plate 9 so as to receive the latter thereinside in a conventional manner. To this end, the plate 10 may be provided internally with a pair of spaced parallel guides, extending along opposite sides of the plate 10 for supporting the plate 9. Such a telescopic arrangement is well known and, therefore, is not specifically illustrated. Hence, the plate 9 is adapted for sliding movement between a folded position thereof when being partly inserted into the plate 10 (FIG. 2) and an extracted position completely projecting from the plate 10 (FIG. 1). An end 12 of the plate 9 is angled and, when in the folded position of the plate 9, protrudes from the plate 10, as better shown in FIG. 2. The plate 10 is at its one end connected by a pair of hinges 11 to the portion 2a, so, as to be rotatable relative to the portion 2a between an open, extracted position of the plate shown in FIG. 1, and a closed, retracted position, when it partly covers the keypad 6. Such a partly retracted position is shown in FIG. 2. To this end, the cover 8 may be formed of a flexible material. A two-segment magnetic clasp, generally at 13, is suitably accommodated on the portion 2a and the plate 10, to keep the cover 8 closed.

It is appreciated that the magnetic clasp 13 may be replaced by any other suitable means, for example, a spring mechanism. It should be noted, although not specifically shown, that the display 7, or an additional suitable display may be located on either side of the plate 10.

Further provided is a conventional antenna 14 which may be a telescopic antenna, mounted on the portion 2a opposite to the display 7. The antenna 14 may be supported on either end of either portion of the bracelet 2 in a manner to extend across the supported portion, so that an axis of the antenna 14 is parrallel to the user's arm. Also provided are a conventional microphone 15 (constituting a mouth piece) mounted on the portion 2a and a speaker unit 16 (constituting an ear piece) located on the angled end 12 of the plate 9.

Figure 3A:
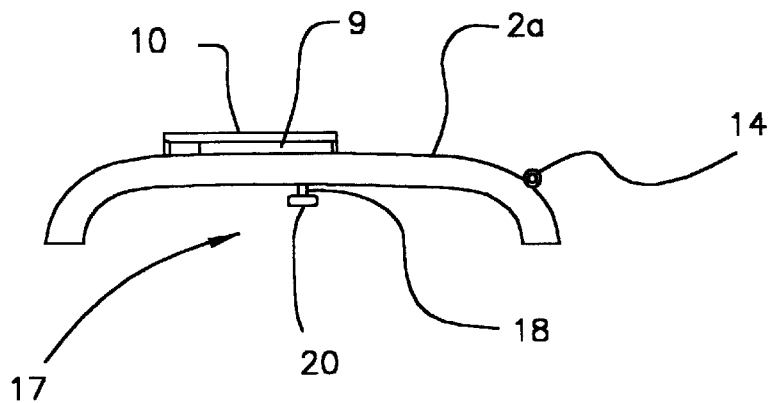
FIG. 3a is a side view of the portion of the device of FIG. 2, more specifically illustrating a mini-vibrator.

As illustrated in FIG. 3a, one of the essential feature of the present invention is the provision of a mini-vibrator 17 having a reciprocating prong 18 projecting from the portion 2a and responsive to a ring signal for prodding the user's wrist so as to inform him/her of an incoming call without disturbing others in the vicinity. A miniature, rubber, disk-shaped washer 20 is attached to a projecting end of the prong 18, which is connected at its opposite end to a conventional cellular phone ringer (not shown) in such a manner that the latter, when actuated by an incoming call, actuates the mini-vibrator 17 causing the reciprocation of the prong 18. In public places where the regular audible ring would disturb, it may be de-actuated, whilst still allowing the user to be informed, via the mini-vibrator 17, of an incoming call. It is evident that the above construction requires substantially small amount of power and does not cause, when in operation, vibrations of the whole device 1.

Figure 3B:
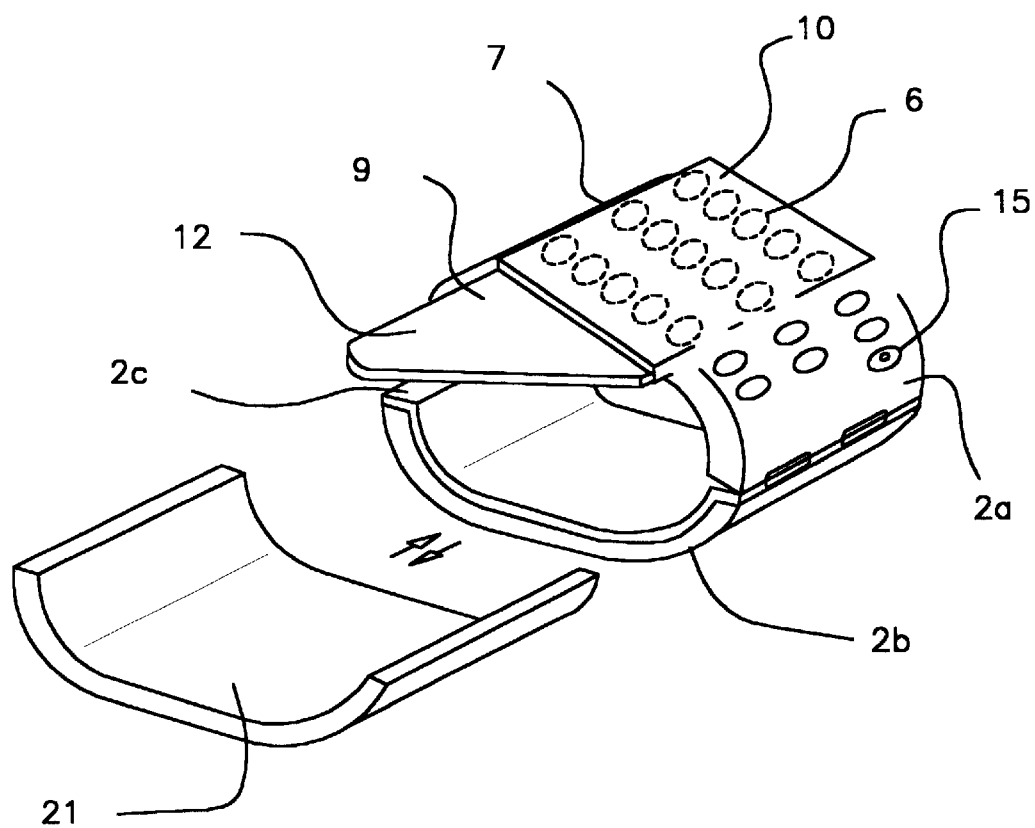
FIG. 3b is a partly exploded view of the device of FIG. 1 with a retracted flip open cover and a battery in its removed position.

Reference is now made to FIG. 3b, illustrating another essential feature of the present invention. A battery 21 is illustrated being shaped like a part of the bracelet 2 and being dimensioned so as to be fit into and removed out of the portion 2b which is generally hollow and functions as a battery holder member. To this end, the hollow portion 2b is provided internally with a pair of peripheral slots, or guides, so as to allow the battery to be slid in and out in a conventional manner. It is understood, although not specifically shown, that the battery 21 is electrically connected to the respective components of the phone mechanism accommodated in the portion 2a. To this end, electric wires are appropriately located inside the portions 2a and 2b.

If desired, the portion 2b may be of two parts construction both parts being, for example, curved-shaped sections designed so as to accommodate a battery therebetween. The construction may be similar to that used in tapes for inserting and removing cassettes, which is known per se and therefore need not be specifically described except to note that it usually includes a spring arrangement actuated by a press button.

Alternatively, although not specifically shown, the battery 21 itself may be provided with a clasp mechanism of a known type and, when attached, for example, in the manner described above with respect to the portions 2a and 2b, completes the overall bracelet shape, thus functioning as an integral portion 2b of the bracelet. The construction may be such that the portion 2b, i.e. associated with the battery, wraps around the whole wrist and the portion 2a, i.e. associated with the phone mechanism, is appropriately coupled to the portion 2b thereabove. Obviously, instead of single battery as described above, two or more batteries having appropriate electric circuit connectors may be employed. For this purpose, the portion 2b may be formed of two or more segments connected by hinges, short belts or the like, each either carrying a battery thereinside or itself being a battery. In the case of short belts, they are short enough so as not to occupy a significant portion of the wearer's wrist. It should be specifically noted that any kind of battery may be employed.

The device 1 being a cellular phone device is designed to include such features of conventional cellular phones as time, date, alarm clock, automatic dialing mode, a phone book, etc. Additionally, a sensor means is provided for automatically putting the device into an operative mode when the plate 10 of the cover is rotated into its open position, and vice versa. All these functions are well known per se and, therefore, need not be specifically described.

The user wears the cellular phone device 1 on his wrist 5, and when using the device, holds his hand to the side of his face in a natural hand position with the bracelet 2 near a region of his mouth. The microphone 15 in the bracelet portion 2*a* is thereby proximate the user's mouth, whilst the tips of his fingers are close to his ear. The speaker 16 in the extended plate 9 of the cover may now be held near to the user's ear. Cupping of the fingers serves to filter out background noise, and simultaneously provide a resonant external cavity for improving the audio quality of the sound emanating from the speaker.

Reference is now made to FIGS. 4*a,* 4*b* and 4*c* illustrating three more embodiments of the present invention, which are in general similar to the above described embodiment and, therefore, those components which are identical in all embodiments are identified by the same reference numerals. Cellular phone devices 100 and 200 are distinguished from each other and from the device 1 by somewhat different constructions of a flip open cover. Thus, as clearly shown in FIG. 4*a,* a cover 108 is formed of two plates 109 and 110 pivotally coupled by a pair of hinges 111 and 112, wherein the speaker is mounted on the plate 109. It will be readily understood that the cover 108 is foldable and extendable like an accordion. An additional two-part magnetic clasp is provided in a conventional manner on an inner surface 109*a* of the plate 109 interfacing an inner side 110*a* of the plate 110, which is not specifically shown. Obviously, such magnetic clasp may be replaced by any other means suitable for the same purpose. A cover 209 of the cellular phone device 200 is a three-plate telescopic cover, wherein a last plate 209 is slidingly insertable into a center plate 210 which, in turn, is receivable by a plate 211 in a manner described above with reference to FIGS. 1–3.

Turning now to FIG. 4*c,* the cellular phone device 300 has no cover at all and is characterized by a flexible thin tube 309 containing connections to the speaker 16 mounted on its free end 309*a.* The other ends of the electrical connections are connected to an audio output of the cellular phone. As shown, the free end 309*a* of the wire 309 is attached to a forefinger 310 of the user by means of a loop 311 (constituting a securing means). Thus, the user's hands are substantially free for operating the phone device 300. A coil spring (not shown) is fixed at one end to the portion 2*a* and is fixed at an opposite end to the free end 309*a* of the tube 309. When the tube 309 is drawn into the extended operated position as shown in FIG. 4*c,* the coil spring is resiliently biased so as to allow for automatic retraction by the coil spring of the tube 309 when required.

It should be noted that both of the C-shaped portions of the bracelet 2 in any of the preferred embodiments described above are preferably formed with rough inner surfaces overlying the user's wrist 5 for preventing undesirable movement of the bracelet 2.

Figure 5A:
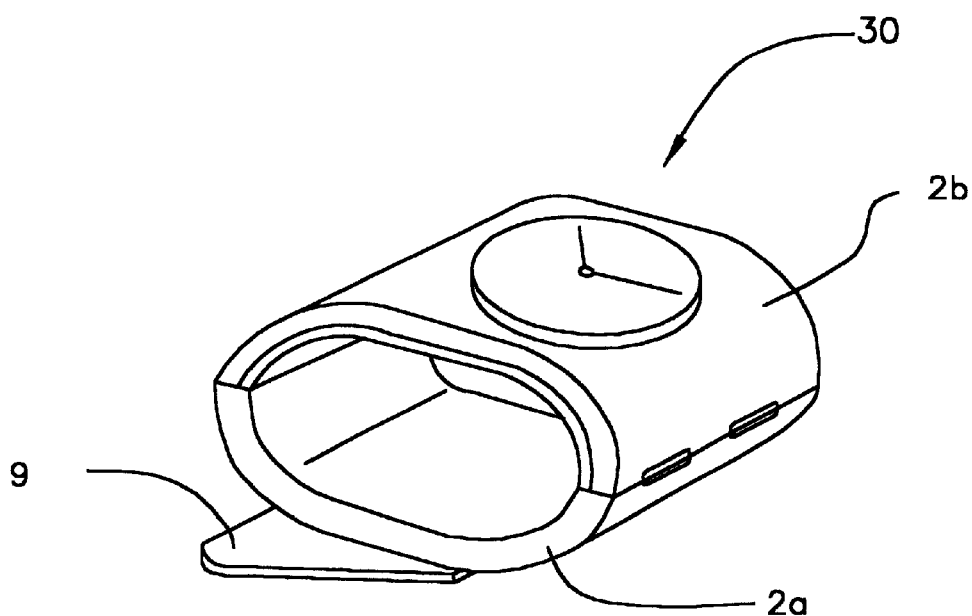
FIG. 5a illustrates still another embodiment of a wrist-mounted cellular phone device having a wrist-watch mounted thereon.
Figure 5B:
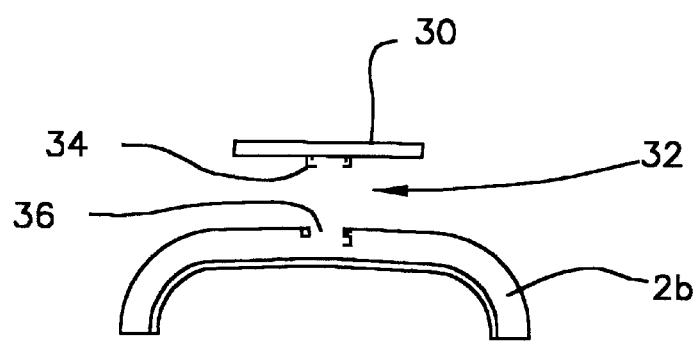
FIG. 5b is a cross-section of the device of FIG. 5a, more specifically illustrating a coupling means for mounting the wrist-watch on to the cellular phone device.

Referring to FIGS. 5*a* and 5*b,* there is illustrated a cellular phone device which is similar to any of the preferred embodiments of the invention, for example the device 1, and additionally comprises a watch unit 30 mounted on the portion 2*b.* To this end, a conventional bolt-and-nut assembly 32 is provided. For example, a screw-threaded bolt 34 projects from a bottom side of the watch unit 30 so as to be received by a nut 36 made in the portion 2*b.* Obviously, any other means may be used for the same purpose. For example, the watch 30 may be mounted on, or integrally formed with, its housing which, in turn, may be coupled to the bracelet 2 by hinges or the like. It should be noted that the construction may be such that the same battery 21 of the cellular phone device 1 supplies power to the watch 30.

In accordance with various configurations of the present invention a multi-sectioned keypad 56 is arranged in various configurations as illustrated in FIGS. 6 through 9, although as stated before the invention is not limited in scope to these configurations. For example, keypad 56 in accordance with the present invention is useable in connection with other types of wrist-worn devices, specifically those that require a keypad as an input device.

By employing a keypad having more than one section, the size of the keypad can be desirably minimized to a smaller size, or, increased to a larger, easier-to-use size as required by the user.

Figure 6A:
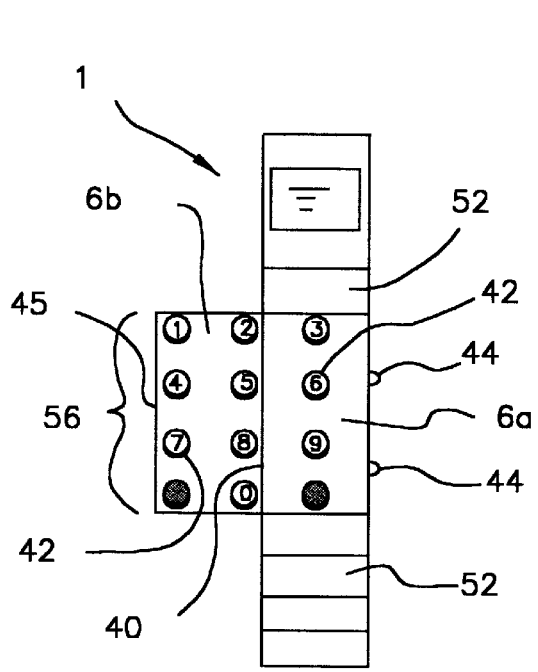
FIGS. 6(a) and 6(b) illustrate a cellular phone device having a two-sectioned keypad provided on a user's wrist, according to one embodiment of the present invention.

For instance, FIGS. 6(*a*) and 6(*b*) and FIGS. 9(*a*) and 9(*b*) illustrate a cellular phone device 1 of the present invention having a two-sectioned keypad 56 provided on a portion of the strap or bracelet of the device. It is noted that the multi-sectioned keypad may be provided on any desired part of a wrist-worn device. Furthermore, multi-sectioned keypad 56, in accordance with other embodiments of the invention is arranged to form an integral part of a strap or bracelet.

In the embodiment shown in FIG. 56, keypad 6 has two sections, sections 6*a* and 6*b,* which are attached to each other by a hinging mechanism, such as hinge 40. Section 6*a* is attached directly to portions of a bracelet or strap 52 of device 1 and section 6*b* is configured to pivotably rotate relative to section 6*a* around hinge 40. Sections 6*a* and 6*b* both have disposed thereon pressure sensitive buttons 42 which the user presses in order to operate a wrist worn device such as the cellular phone. Specifically, keypad 56 is electrically coupled to the phone mechanism of device 1 and sends signals to the phone mechanism corresponding to the buttons which are pressed by the user.

FIG. 6(*a*) shows device 1 in an opened position, wherein section 6*b* of keypad 6 is pivoted around hinge 40 so as to provide access to buttons 42 of keypad 6. Preferably, keypad 56 is configured such that, when section 2*b* is pivoted into the open position, sections 6*a* and 6*b* form a substantially flat surface for easy manipulation by the user. Buttons 42 are arranged on keypad 6 in a well-known manner, such as on an ordinary telephone, and are spaced sufficiently far apart so as to minimize the likelihood of the user inadvertently pressing buttons which the user does not intend to press.

In order to provide still greater space between buttons 42, device 1 is shown in FIGS. 6(*a*) and 6(*b*) as having additional function buttons 44 positioned on the side of keypad 56 and along the edge of strap 52. Buttons 44 may, according to one embodiment, enable the user to initiate a call, terminate a call, operate a menu displayed by a display unit, etc.

FIG. 6(*b*) on the other hand shows device 1 in a closed position, wherein section 6*b* of keypad 56 is pivoted around hinge 40 so as to conceal buttons 42 of keypad 56, i.e.—to prevent buttons 42 from being inadvertently pressed or to protect them from dust, water, etc. In this embodiment, keypad 56 requires only about half the space it required in the open position illustrated in FIG. 6(*a*).

In addition to decreasing the size of the keypad as illustrated by FIGS. 6(*a*) and 6(*b*), a multi-sectioned arrangement of keypad 56 may also enable the overall size of device 1 to be decreased. Typically, when a keypad is disposed on the strap or bracelet of a wrist worn device, the strap is substantially the same width of the keypad. This insures that the edges of the keypad do not extend past the bracelet and rub the wrist of the user, and also decreases the likelihood that the outer edges of the keypad will be damaged by contact with other surfaces.

In order to prevent any discomforts associated with the keypad many prior art wrist worn devices are configured to have a width that is larger than typical straps or bracelets to somehow accommodate the keypad. However, the wider strap or bracelet adds to the size and weight of the device, causing it to be too bulky and heavy.

The present invention enables the width of the bracelet of the wrist-worn device to be substantially the same as the keypad, without requiring an uncomfortably wide strap or bracelet. Specifically, when keypad 56 is in the closed position, its width is decreased by half to the width of section 6a. Consequently, the corresponding width of strap or bracelet 52 of device 1 may be designed with the narrower width of section 6a, so long as the bracelet is wide enough to support a sufficiently large battery power source.

As previously mentioned, the design of strap or bracelet 52 of device 1 having the same width as keypad 56 maximizes the aesthetic appeal of the device and minimizes the likelihood that keypad 56 will interfere with the mobility of the user's wrist or be damaged when worn by the user.

Figure 6B:
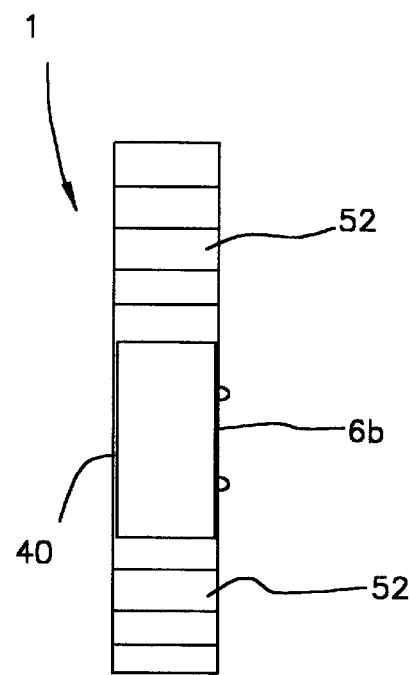

As previously mentioned, FIG. 6(b) shows device 1 when it is closed and conceals buttons 42. In a preferred embodiment, buttons 42 are positioned on sections 6a and 6b, respectively, so as not to contact each other when section 6a is closed over section 6b. This embodiment decreases the combined thickness of sections 6a and 6b when closed, thus rendering device 1 less bulky on a user's wrist. In addition, it limits the wear and tear on buttons 42 since they will not be pressed down upon when the device is in the closed position.

For instance, FIGS. 7(a) and 7(b) illustrate an arrangement of buttons 42 on sections 6a and 6b which prevents the buttons of each section from contacting each other when the device 1 is in the closed position. FIG. 7(a) shows keypad section 6a having two columns of buttons 42, one column in each of regions 45 and 46, which are located along its outer edge regions. In addition, the figure shows section 6b having one row of buttons 42 in region 47, which is located in its middle. FIG. 7(b) shows that, when section 6a and 6b are brought into the closed position, regions 45, 46 and 47 do not overlap, and thus the buttons do not contact each other. It is noted, however, that the regions shown in FIGS. 7(a) and 7(b) are merely illustrative, and that the present invention contemplates any configuration of buttons on keypad sections 6a and 6b which prevents buttons 42 from contacting each other when the device is in the closed position.

Figures 8A, 8B:
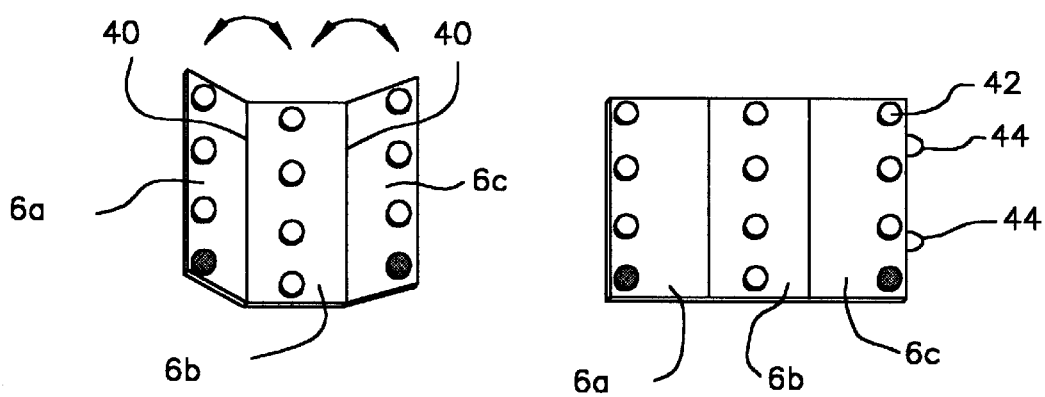
FIGS. 8(a) through 8(d) show additional configurations of device 1 having a multi-sectioned keypad, according to other embodiments of the present invention.

FIGS. 8(a) through 8(d) show additional embodiments of device 1 having multi-sectioned keypad 56. For instance, FIG. 8(a) shows keypad 56 having three sections. A middle section 6b is connected on opposite sides to sections 6a and 6c by hinges 40. In this embodiment, the space required by keypad 56 in the closed position is only approximately one third of the space required by keypad 56 in the open position. FIG. 8(b) illustrates the same keypad as illustrated in FIG. 8(a) in the fully opened position, having a substantial space between each of buttons 42.

Figure 8C:
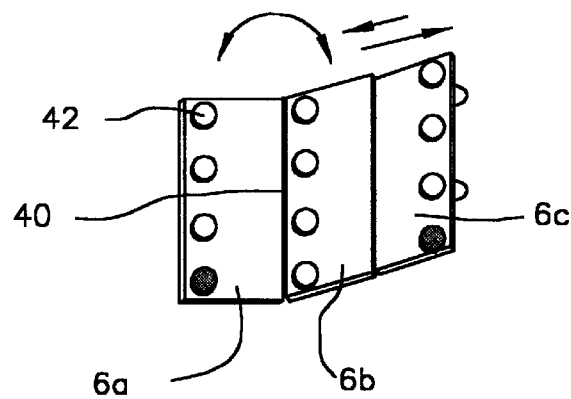
Figure 8D:
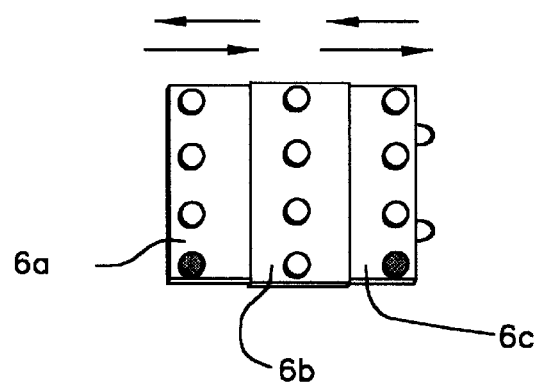

FIG. 8(c) illustrates another embodiment in which keypad 56 comprises three sections, wherein two of the sections are provided having a telescopic arrangement relative to each other. For instance, section 6a is connected to section 6b by hinge 40. However, section 6b is also provided internally with a pair of spaced parallel guides extending along opposite sides of section 6b for supporting section 6c. FIG. 8(d) illustrates still another embodiment in which keypad 56 comprises three sections, wherein two of the sections are provided having a telescopic arrangement relative to the third section. For instance, section 6b is provided internally with two pairs of spaced parallel guides extending along opposite sides of section 6b for supporting both sections 6a and 6c. As previously explained, each of the embodiment shown in FIGS. 6 through 9 provide for a multi-sectioned keypad 6, which decreases the space required by keypad 6 and improves wrist-worn cellular phone device 1.

Figure 9A:
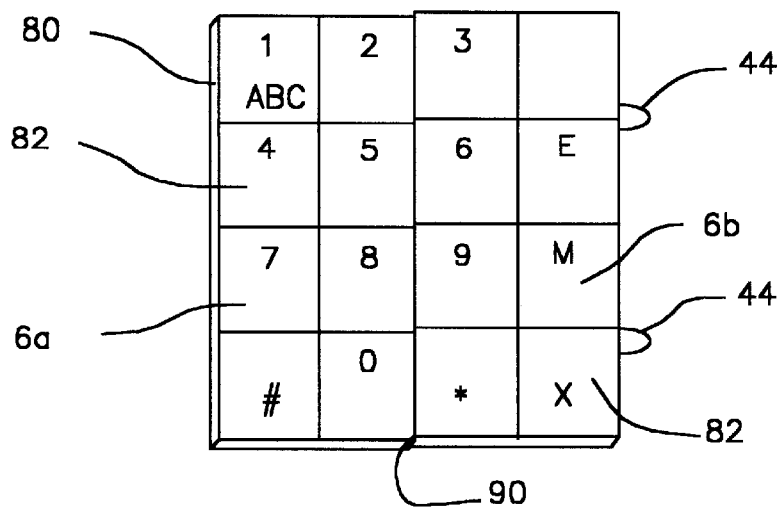
FIGS. 9(a) through 9(c) show additional configurations of device 1 having a multi-sectioned keypad employing pressure sensitive transducers.
Figure 9B:
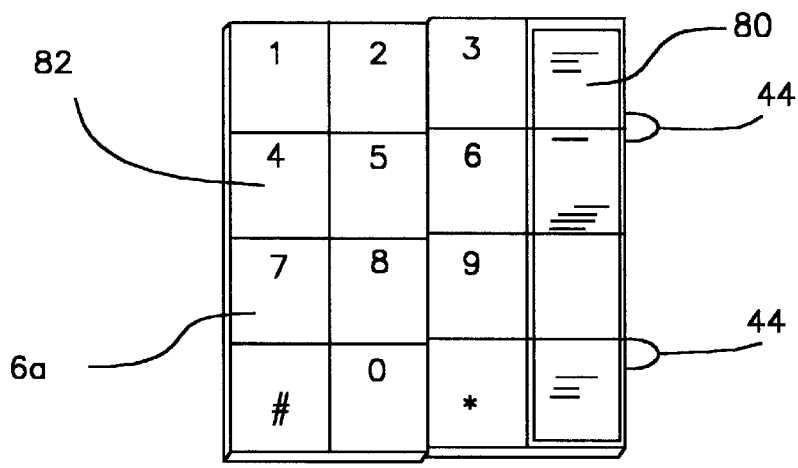
Figure 9C:
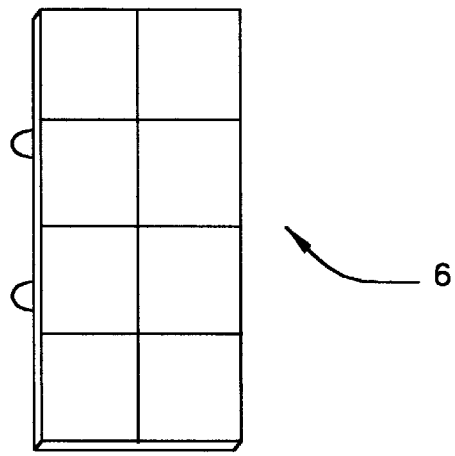

FIGS. 9(a) through 9(c) illustrate another embodiment of multi-sectioned keypad 56 arranged as a membrane keypad in accordance with the present invention. In this embodiment, key elements 82 employ touch actuated switches formed on a membrane 84. As illustrated in FIG. 9(a) keypad 56 comprises at least two sections 6a and 6b that are desirably folded over each other along an axis 90. The structure and operation of membrane keypads are well-known and described for example in U.S. Pat. No. 3,987,259 or U.S. Pat. No. 4,489,302 an incorporated herein by reference. Briefly, a plurality of electrodes are disposed over each other in a spaced-apart relationship. When any of the key elements 82 are pressed, some of the electrodes establish an electrical connection that can result in a signal indicating the particular key element that has been pressed. In accordance with one embodiment of the invention, such membrane keypads are made of substantially flexible material, such as plastic that has sufficient resiliency to extend around a user's wrist in a curved arrangement.

In accordance with another embodiment of the invention, in addition to key elements 82, keypad 56 further comprises a display unit 80 as illustrated in FIG. 9(b). A wrist worn device in accordance with the present invention allows for a remarkably convenient viewing and operation by a user. Display unit 80 displays information corresponding to the operation of the wrist worn device, such as the operation of a phone mechanism. FIG. 9(c) illustrates keypad 56 in a folded position over a strap or bracelet 52. As stated before, in accordance with other embodiments of the invention, display unit 80 may be disposed in various portions of strap or bracelet 52.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

I claim:

1. A wrist-mounted electronic device for attaching to a wearer's wrist, the device comprising a multi-sectioned keypad unit having a predefined number of keys, wherein said multi-sectioned keypad unit comprises;

a first section attached to said device, and;

additional adjustable sections, wherein;

said sections are as small as desired, and wherein the quantity of said sections is a function of the sizes of said sections, the quantity of said predefined number of keys and the distance required between said keys;

said multi-sectioned keypad is configured to move between a closed position and an open position, wherein in open position said sections of said multi-sectioned keypad expand to provide an enlarged, integrated keypad surface wherein at least twelve keys of said predefined number of keys of the keypad unit being thereby arranged on at least two sections of said enlarged surface in a manner to define a layout of three columns and four rows together forming a telephone keypad for dialing phone numbers, wherein one of said key columns is located on one of said keypad sections and the remaining two key columns are located on at least another keypad section.

2. The device according to claim 1, wherein in open position the size of said enlarged surface and the distance between said sections are so that said keys of said keypad unit are spaced sufficiently far apart on said enlarged surface so as to minimize the likelihood of a user's finger inadvertently pressing buttons which said user does not intend to press.

3. The device according to claim 1, wherein said first sections of said keypad locates on said wrist device body.

4. The device according to claim 2, wherein at least one of said additional sections is attached to said first section to form an integrated flat surface when said keypad is in open position.

5. The device according to claim 4, wherein some of said keypad keys are positioned on said first section and the rest of said keys are arranged on other sections.

6. The device according to claim 4 wherein at least two sections of said keypad unit, each contain at least one of said key columns.

7. The device according to claim 6, wherein in open position, the enlarged surface of the keypad unit being thereby adapted to perform a distance between the key rows of one section relative to the key rows of other sections so as said key rows of said keypad unit are spaced sufficiently far apart on said enlarged surface so as to minimize the likelihood of a user's finger inadvertently pressing buttons which said user does not intend to press.

8. The device according to claim 1, wherein said multi-sectioned keypad comprises two sections.

9. The device according to claim 1, wherein at least two sections of said keypad unit are pivotally attached to each other.

10. The device according to claim 1, wherein at least two sections of said keypad unit are telescopically attached to each other.

11. The device according to claim 9, wherein the keys of one section of the keypad unit locate in spaces between the keys of at least one other section when said sections are pivoted relative to each other to form a closed position.

12. The device according to claim 1, wherein said multi-sectioned keypad comprises three sections.

13. The device according to claim 12, wherein each of said three sections contain one of said key columns.

14. The device according to claim 8, wherein one of said two sections contain two of said key columns.

15. The device according to claim 1, wherein ten of said twelve keys correspond to the numbers 0 through 9 and the remaining two keys correspond to one of the characters "*" and "#".

16. The device according to claim 1, wherein ten of said twelve keys correspond to alphanumeric characters to permit text input.

17. The device according to claim 16, wherein said alphanumeric characters are distributed on said twelve keys of said multi-sectioned keypad in the same configuration as alphanumeric characters are configured on a standard telephone.

18. The device according to claim 16, wherein said wrist mounted electronic device is a wrist mounted telephone device.

19. The device according to claim 1, or 18, wherein said device further comprises a watch unit.

20. The device according to claims 19, wherein said keypad unit and said watch unit are disposed in opposite relationship on a wearer's wrist.

21. The device according to claim 1, or 18, further comprising a display unit and a watch unit.

22. The device according to claim 21, wherein said display unit and said watch unit are located in opposite relationship on a wearer's wrist.

23. The device according to claim 19, wherein said watch unit functions independently from said device.

24. In an electronic device, a multi-sectioned keypad unit comprising:

a plurality of sections wherein at least one of said sections is coupled to said device and wherein at least one pair of said sections are pivotally attached to each other wherein each section of said pairs having a predefined number of keys;

said multi-sectioned keypad unit is configured to move between a closed position and an open position, wherein in said open position, said multi-sectioned keypad expands to provide an enlarged keypad surface, forming a layout of key rows and key columns, wherein the space between adjacent keys in each row is at least as wide as a width of each key, and wherein in closed position, the first and the second section of said pivotally attached pair of sections are pivoted face to each other so as the keys of said first section locate in spaces between the keys of said second section enabling the keys of said first section to be non-contiguous with the keys of said second section, resulting said multi-sectioned keypad to be minimal in thickness.

25. The device according to claim 24, wherein said enlarged keypad surface comprises twelve keys arranged to duplicate the arrangement of keys of a standard telephone.

26. The device according to claim 24, wherein said electronic device comprises a wrist-worn telephone device.

* * * * *